United States Patent [19]
Noel

[11] 3,737,084
[45] June 5, 1973

[54] AUTOMATIC MUFFIN TINING MACHINE WITH ADJUSTABLE SPLIT

[76] Inventor: Eugene M. Noel, 42 Kingston Rd., Newton Highlands, Mass. 02161

[22] Filed: Feb. 7, 1972

[21] Appl. No.: 224,067

[52] U.S. Cl. ............................ 225/97, 83/2, 225/93, 225/96
[51] Int. Cl. ................................................ B26f 3/02
[58] Field of Search .................... 83/2, 4; 225/96, 225/93, 97

[56] References Cited

UNITED STATES PATENTS

| | | | |
|---|---|---|---|
| 3,192,975 | 7/1965 | Noel | 83/2 X |
| 3,704,735 | 2/1971 | Noel | 83/2 |

*Primary Examiner*—J. M. Meister
*Attorney*—Charles W. Rummler and William A. Snow

[57] ABSTRACT

An automatic muffin splitting machine of increased productivity having a continuously traveling conveyor belt for 6 muffins to a tining section to be tined and split, said tining section having first and second pluralities of tines operating from respective opposite sides of the conveyor belt, said pluralities of tines traversing the belt in simultaneous reciprocal interdigitating cooperation from the opposite sides thereof and the first plurality of tines being automatically lifted out of the plane of interdigitation with the second plurality of tines to split the muffin as full penetration of the tines into the muffins is reached, the tining operation being intermittent to act on a predetermined group of muffins and being powered and coordinated with the movement of the traveling belt by twin pilot-operated air cylinders for reciprocating the tining bars carrying the first and second pluralities of tines, and said splitting of said tined muffins being coordinated with the tining operation by pilot-operated air cylinders for lifting said first plurality of tines out of said plane of interdigitation with said second plurality of tines; whereby the machine automatically produces muffins tined and split, but not fully separated, for easy hand opening and having the proper split surface for best grilling or toasting.

5 Claims, 5 Drawing Figures

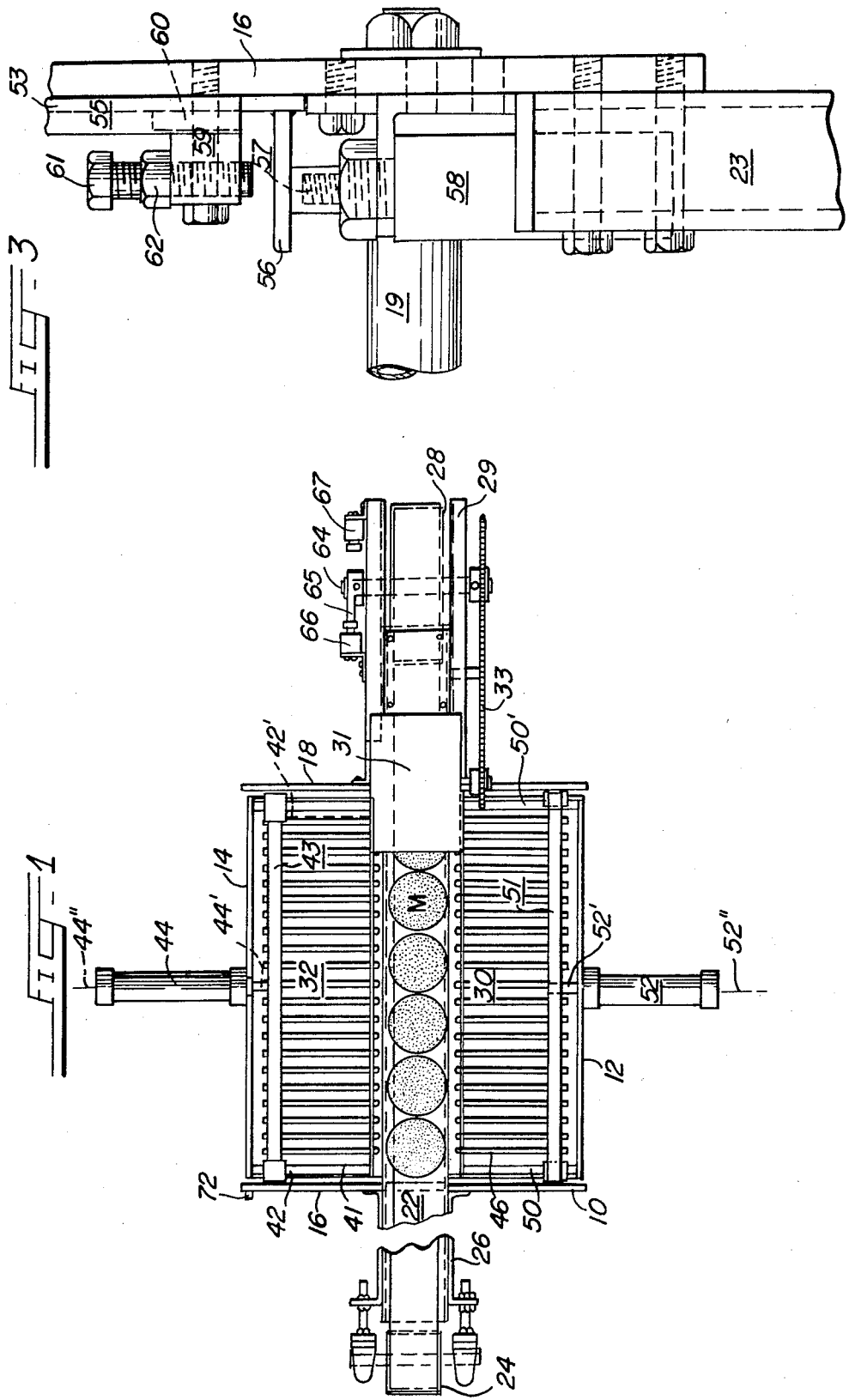

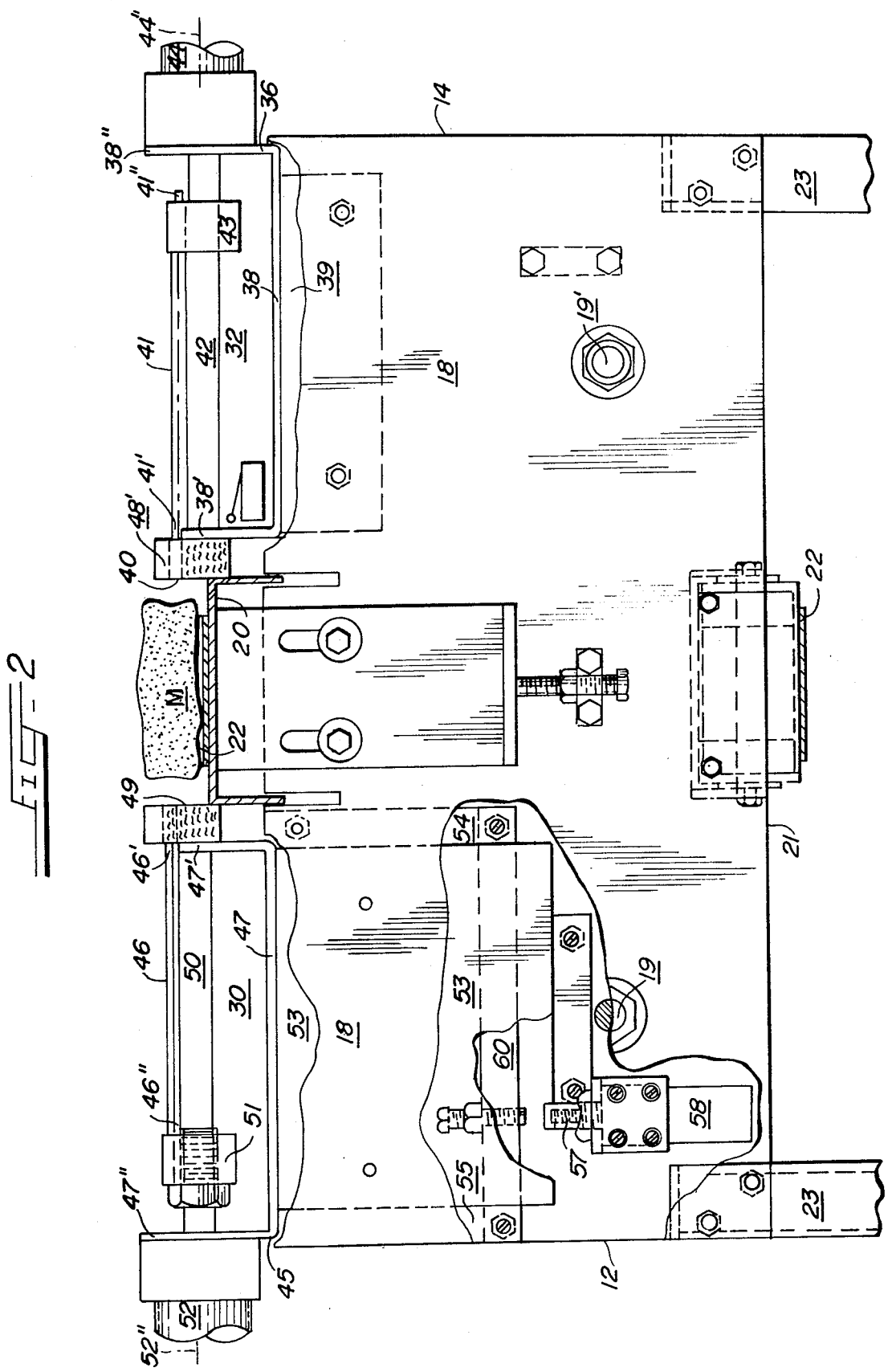

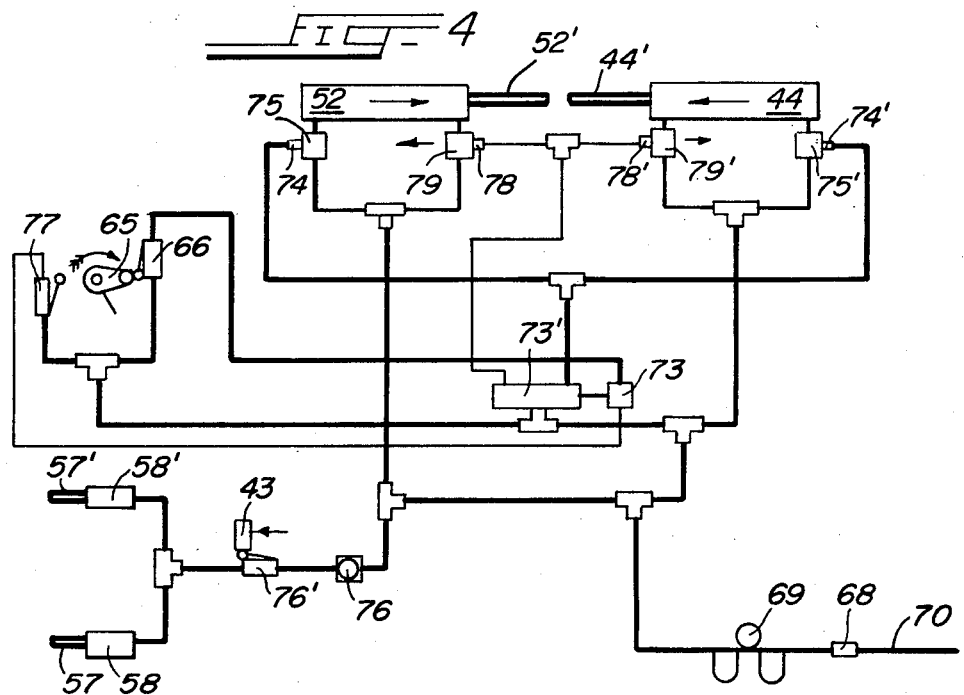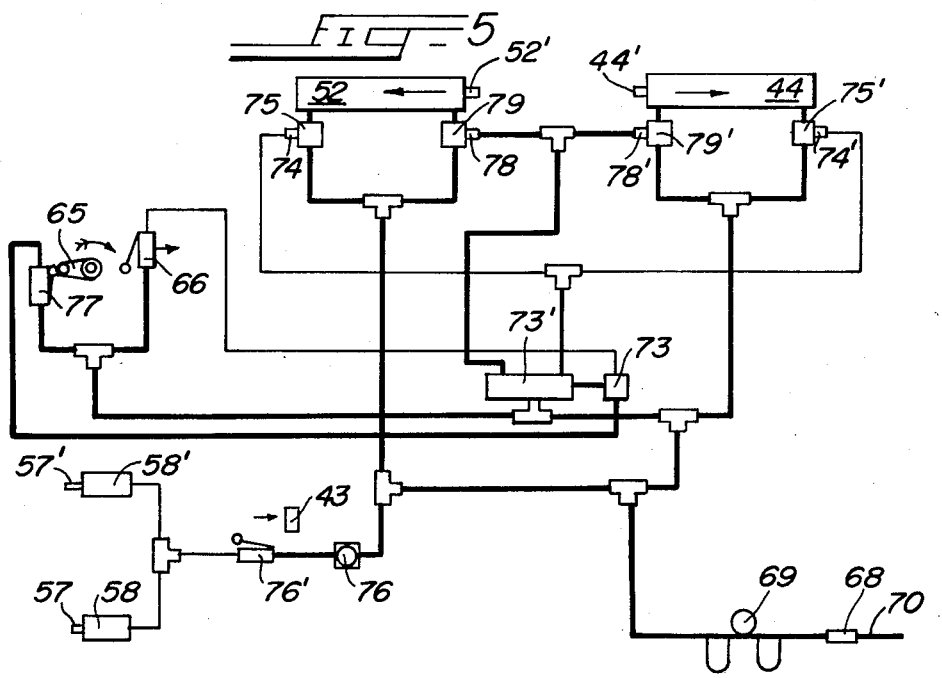

3,737,084

AUTOMATIC MUFFIN TINING MACHINE WITH ADJUSTABLE SPLIT

BACKGROUND OF THE INVENTION

This invention relates to a high-productivity, air cylinder-powered muffin tining and splitting machine suitable for the intermediate sized muffin manufacturer or distributor who serves that discriminating muffin market which demands a muffin which can be easily hand opened at the time of consumption and which has the flat rough surface characteristic that is best for grilling and toasting.

A muffin properly tined and split for hand opening allows the users to easily open the muffin exposing two rough surfaces on halves of equal thickness. This is not possible with the non-split muffin. The muffin so split allows the high portions of the rough surfaces to carmelize or carbonize during grilling and toasting and drives the heat of the toasting application into the pores and holes of the muffin making a more tasty product. A muffin properly tined and split for easy hand opening also has the same shelf life as a non-split muffin. Muffins which are properly split provide that rough "crumbly" surface which, when heated, absorbs melted butter in a superior manner, as contrasted to the glaze on a smooth knife-cut surface, resulting in a superior food product for the discriminating muffin market.

Since the issue of U.S. Pat. No. 3,192,975 on July 6, 1965, covering an automatic, high production rate muffin tining and splitting machine, the market for such special purpose equipment has broadened to include a demand for a low cost, automatic muffin tining and splitting machine having a muffin production rate of around 160 muffins per minute.

SUMMARY OF THE INVENTION

The principal object of this invention is to provide a low cost, automatic muffin splitting machine for producing muffins which the user can easily open into two rough-surfaced halves of approximately equal thickness at a production rate of around 160 muffins per minute. The machine is to be capable of lifting and partially separating the top half of the muffin from the bottom half by adjustable amounts to satisfy the desires of the most discriminating muffin consumers.

The gist of this invention lies in the use of a traveling belt for continuously receiving muffins from a conveyor and delivering said muffins intermittently to a machine having a tining section, said tining section having a first plurality of tines on a first side of the belt and a second plurality of tines on a second side of the belt, said first and second pluralities of tines each being intermittently interdigitated, and said first and second tine sections being actuated in simultaneous reciprocal traverse of said belt in the tining of said muffins thereon by separate twin air cylinders which are pilot valve-operated in the proper phase relationship with respect to said belt travel by a cam actuator rotatably mounted to the belt drive. Automatic lifting of the first plurality of tines relative to the plane of the second plurality of tines upon completion of the full penetration of the tines through the muffins partially tears or splits the tined muffins without fully separating the halves, rendering subsequent hand opening easy.

The mechanism according to the present invention comprehends the movement of the muffins along a belt where they are perforated from opposite sides by twin sets of tines supported for reciprocal interdigitating movement transverse to the belt. The sets of tines enter the muffins in a simultaneous perforating and penetrating operation and they retract therefrom to provide the muffin with a multiplicity of closely spaced holes or perforations which enables it to be torn apart by hand along what may be likened to a weakened cleavage plane. The resultant muffin halves, instead of having smooth surfaces, which would result from the usual knife or saw blade-cutting operation, have flat and open textured and somewhat roughened surfaces, which make the muffin halves more desirable for toasting or grilling. Also, with the present mechanism, the muffins are more uniformly divided so that the resulting halves are of substantially equal thickness to facilitate mechanical toasting or grilling procedures.

In the embodiment of the invention shown and described herein, the muffins are not only perforated by the tines, but one of the plurality of interdigitating tines is lifted out of the plane of the other plurality of tines at the time of complete penetration of the muffins, but only enough to effect an incomplete separation of the two halves of the split muffin. This serves to provide a muffin much desired by the industry which the user can easily open by hand into two uniformly rough surfaced halves.

DESCRIPTION OF THE DRAWINGS

In order to demonstrate the invention, reference is made to the specific embodiment illustrated by the drawings, in which reference numbers which are unprimed refer to elements of the invention which are described and reference numbers which are primed refer to corresponding elements which may not be mentioned but which are inherent to the invention.

FIG. 1 is a plan view of the automatic muffin-splitting machine showing the horizontal relationship of the belt traveling on top and from one end of the frame of the machine to the other; the first and second tine sections on opposite sides of the belt and the muffins thereon, and the twin air cylinders for actuating the tining of the muffins from opposite sides thereof;

FIG. 2 is a fragmentary elevational view of the same showing the vertical relationship of the muffins on the belt traveling on the top of the frame of the machine and the first and second tine sections in position for beginning the simultaneous tining of the muffins thereon;

FIG. 3 is a fragmentary elevational view of one of the air cylinders mounted to a frame end for lifting the first tine section out of the plane of interdigitation with the second tine section in the muffin splitting operation;

FIG. 4 is a schematic diagram of the control and actuating system as energized for coordinating the penetration of the tines into the muffins with the travel of the belt on the machine; and FIG. 5 is a schematic diagram of the control and actuating system as energized for the withdrawal of the tines from the muffins.

DESCRIPTION OF THE PREFERRED EMBODIMENT

Referring to the drawings, particularly FIG. 1, the automatic muffin tining machine with adjustable split comprises a frame 10 having a first side 12 and a second side 14, a first end panel 16 structurally tied to a second end panel 18 by tie-bars 19 and 19', as shown in FIG. 3, said frame supporting a horizontal top 20 and having supporting legs 23, as shown in FIG. 2. The top 20 mounts first and second tining sections 30 and 32 thereon. Belt 22 traverses said top 20, as shown in FIGS. 1 and 2, midway between said first side 12 and said second side 14 in continuous travel from the idler pulley 24, which is rotatably mounted on a suitable support structure 26 extending from the first end panel 16, to the drive pulley 28, which is rotatably mounted on the support structure 29 extending from the second end panel 18. The drive pulley 28 is driven by the motor 31 which is mounted on the frame 10, through a conventional chain and sprocket drive train 33. The belt 22 travels in return circuit under the bottom 21 of the frame 10, as shown in FIG. 2.

A first tine section 30, located to the first side 12 of the frame 10 adjacent to the first side of the belt 22, and a second tine section 32, located to the second side 14 of the frame 10 adjacent to the second or opposite side of the belt 22, are operated to penetrate the muffins M from opposite sides and in simultaneous reciprocal interdigitating cooperation.

The second tine section 32, as shown in FIG. 1, is comprised of a structural channel 36 having a base 38 with a foreleg 38' and a backleg 38'', as shown in FIG. 2, each leg extending from adjacent to the first end panel 16 to adjacent to the second end panel 18. Twin brackets 39 and 39' which are attached to first end panel 16 and to second end panel 18, respectively, fixedly support the base 38 of the second tine section 32 on the top 20, as shown in FIG. 2. The foreleg 38' mounts a pilot bar 48' adjacent and parallel to the second side of the belt 22 which has a plurality of horizontally directed equally spaced guide holes 40 along the length of the structural channel 36 for the slide-piloting of the bayonet ends 41' of the tines 41 of the second tine section 32 in the penetration of the muffins M from the second side 14 thereof.

Twin slide rods 42 and 42' which are part of second tine section 32 tie backleg 38'' of channel 36 to the foreleg 38' adjacent and parallel to the first end panel 16 and the second end panel 18, respectively, as shown in FIGS. 1 and 2. A tine bar 43 is slidably supported on twin slide rods 42 and 42' to reciprocate in a horizontal plane perpendicularly to the direction of travel of belt 22. Butt ends 41'' of the plurality of the equally spaced tines 41 comprising the second tine section 32 are fixedly supported by tine bar 43. Bayonet ends 41' of each of the tines 41 in the guide holes 40 in the pilot bar 48' line up with the butt ends 41'' for perpendicular traverse of belt 22 in the reciprocation thereover.

A piston rod 44' of a double-acting air cylinder 44 having an axis 44'' engages the tine bar 43 for slidingly actuating said tine bar 43 in reciprocation on said twin slide rods 42 and 42', as shown in FIG. 1. The air cylinder 44 fixedly mounts on and has a line of action 44'' in a horizontal plane perpendicular to the backleg 38'' of the channel 36. Air pressure on the head end of the air cylinder 44 extends the piston rod 44' from cylinder 44 moving the connecting tine bar 43 and the plurality of tines 41 of tine section 32 in traverse of belt 22 in a direction from the second side 14 of the frame 10 for the penetration of muffins M thereon. Air pressure on the rod of cylinder 44 retracts the piston rod 44' into cylinder 44 withdrawing the tines 41 from the muffins M.

The first tine section 30, as shown in FIG. 1, is comprised of a structural channel 45 having a base 47, a foreleg 47' and a backleg 47'', as shown in FIG. 2, each leg extending from adjacent to the first end panel 16 to adjacent to the second end panel 18. The structural channel 45, which lifts relative to the top 20 adjacent to the first side of the belt 22, as shown in FIG. 2, mounts a pilot bar 48 on foreleg 47' adjacent and parallel to the first side of the belt 22. Pilot bar 48 has a plurality of horizontally directed guide holes 49 which are interdigitatingly disposed between the guide holes 40 on the aforementioned second side 14 and equally spaced along the length of the structural channel 45 for the slide-piloting of the bayonet ends 46' of the tines 46 of the first tine section 30 in the penetration of muffins M from the first side 12 thereof.

Twin slide rods 50 and 50', which are part of first tine section 30, tie backleg 47'' of channel 45 to the foreleg 47' adjacent and parallel to the first end panel 16 and the second end panel 18, respectively, as shown in FIGS. 1 and 2. A tine bar 51 is slidingly supported on twin slide rods 50 and 50' to reciprocate in a horizontal plane perpendicularly to the direction of travel of belt 22. Butt ends 46'' of the plurality of the equally spaced tine 46 comprising the first tine section 30 are fixedly supported by tine bar 51. Bayonet ends 46' of each of the tines 46 in the guide holes 49 in the pilot bar 48 line up with the butt ends 46'' for perpendicular traverse of belt 22 in the reciprocation thereover. Tines 46 of first tine section 30 are thus interdigitatably disposed between the tines 41 of second tine section 32 for simultaneous reciprocal penetration of muffins M from opposite sides.

A piston rod 52' of double-acting air cylinder 52 having an axis 52' engages the tine bar 51 for slidingly actuating said tine bar 51 in reciprocation on said twin slide rods 50 and 50', as shown in FIG. 1. The air cylinder 52 fixedly mounts on and has a line of action 52'' in a horizontal plane perpendicular to the backleg 47'' of the channel 45. Air pressure on the head end of the air cylinder 52 extends the piston rod 52' from cylinder 52 moving the connecting tine bar 51 and the plurality of tines 46 of the tine section 30 in traverse of belt 22 in a direction from the first side 12 of the frame 10 for the penetration of muffins M thereon. Air pressure on the rod end of cylinder 52 retracts the piston rod 52' into cylinder 52 withdrawing the tines 46 from the muffins M.

For the splitting of the muffins, slide plates 53 vertically slide against the inside faces of each of the end panels 16 and 18 and are guided thereon by the slide forebars 54 and the slide backbars 55 mounted thereon. Base 47 of the tine-carrying channel 45 is structurally connected at the opposite ends thereof to the respective slide plates 53 so that a vertical slide of said plates lifts the tines 46 out of the plane of interdigitation with the tines 41. Brackets 56 each mount to respective side plates 53, as shown in FIGS. 2 and 3. Piston rod ends 57 and 57', see FIGS. 4 and 5, extend from single-acting air cylinders 58 and 58', one of which is fixedly mounted to the inside face of each of the end panels 16 and 18. Each rod end 57 and 57' engages a respective bracket 56 and the piston rod ends 57 and 57' are projected from the cylinders 58 and 58' under the action of air pressure on the head end of the air cylinders for lifting the tines 46 out of the plane of interdigitation with the tines 41. In reverse action, the exhaustion to atmosphere of air pressure from the head end of the air cylinders 58 and 58' lowers said tines 46 into the plane of interdigitation with tines 41 under the action of gravity.

The lift of the tines 46 relative to the tines 41 and the split of muffins M is adjusted by the vertical movement adjustable stops 59 which are mounted on a transverse member 60, as shown in FIGS. 2 and 3. The transverse member 60 lies adjacent to and engages the brackets 56. Spaced forebars 54 and backbars 55 mount members 60 over the inner faces of end panels 16 and 18 providing sliding working clearance for slide plates 53 thereover. Adjustable stops 59 have a conventional threaded bolt 61 and a jambnut 62 construction.

A control cam 65 mounted on a drive shaft 64 coordinates the actuation of the muffin tining and the muffin splitting operations of this machine in the proper sequence with the travel of the belt 22 and the movement of the muffins M thereon. As shown in FIG. 1, the drive shaft 64 rotatably mounts a drive pulley 28 on a structural support 29 extending from the end 18 of the frame 10. The control cam 65 is mounted on and constrained to rotate with the output or drive pulley shaft 64 for the coordination of the travel of the belt 22 with the rotation of the control cam 65.

Pressurized air for the control and actuating of the tining and splitting operations of muffins M is supplied through a main air supply line 70 to a quick-disconnect 68, as schematically shown in FIGS. 4 and 5. The quick-disconnect 68 is connected to a conventional source of industrial pressurized air. A filter, lubricator and pressure regulator assembly 69 is connected to the quick-disconnect 68.

The control and actuating air lines are pressurized for the muffin penetration mode are shown in heavy line in FIG. 4. The corresponding lines exhausting to atmosphere are shown in light line. A first pilot valve 66 which is in fluid communication with supply line 70, as shown in FIG. 4, operationally engages the control cam 65 and actuates the muffin tining operation. A shuttle valve 73 fluid-connects with and is operationally controlled by pilot valve 66. A first directional control valve 73', in fluid communication with and operationally controlled by the shuttle valve 73, diverts the control air from actuating the penetration of the muffins M with the tines 41 and 46 to their withdrawal therefrom.

In the penetration mode, the rod ends of the cylinders 44 and 52 exhaust to the atmosphere. Second pilots 78 and 78', which are in fluid communication with and operationally controlled by directional control valve 73', command the rod ends of the cylinders 44 and 52 to exhaust air to the atmosphere during this mode of operation. The second pilot-operated flow control valves 79 and 79', which are in fluid communication with the rod ends of cylinders 44 and 52 and which normally open to exhaust to atmosphere, are operationally connected with and under the command of pilots 78 and 78'.

Simultaneously with the exhaust of the rod ends of the cylinders 44 and 52, first pilots 74 and 74', which are in fluid communication with and operationally controlled by directional control valve 73', command the delivery of actuating air to the head ends of cylinders 52 and 44 through first pilot-operated flow control valves 75 and 75', which, though normally open to exhaust to the atmosphere, are in operational connection with and under command of pilots 74 and 74' to deliver air to the head ends of cylinders 52 and 44.

Thus the flow control valves 79 and 79' and 75 and 75', which are in fluid communication with the rod ends and the head ends of the cylinders 52 and 44, respectively, when operating under the command of the pilots 78 and 78' and 74 and 74', exhaust the rod ends and supply the head ends of cylinders 52 and 44 with pressurized air; so that when the control cam 65 engages the first pilot valve 66, the muffins M are penetrated and tined from both sides in simultaneous reciprocal cooperation of the tines.

For the lifting of the tines 46 out of the plane of interdigitation with the tines 41 in the splitting of the muffins M a shut-off valve 76 is in fluid communication with the main supply line 70 and a normally closed third pilot valve 76' is in fluid communication with the shut-off valve 76, as shown in FIGS. 4 and 5. Air cylinders 58 and 58' for lifting the first tine section 30 have their head ends in fluid communication with the third pilot valve 76'. At the completion of the penetration of the muffins M by the tines 41 of the second tine section 32 the tine bar 43 of tine section 32 engages and opens the third pilot valve 76', as shown in FIGS. 2 and 4, and the cylinders 58 and 58' are actuated to project their rod ends 57 and 57' under the action of air pressure from the main supply line 70.

For the lowering of the tines 46 into the plane of interdigitation with the tines 41 for the withdrawal of tines 41 from the muffins M under the action of the tine bar 43 of the second tine section 32 the tine bar 43 is disengaged from the normally closed third pilot valve 76', as shown in FIGS. 2 and 5, closing off the main supply line 70 from fluid communication with the head ends of the cylinders 58 and 58' and exhausting the head ends to atmosphere permitting the first tine section 30 to lower the tines 46 into the plane of interdigitation with the tines 41 under the action of its own weight.

The main air supply line 70 also supplies pressurized air for the control and the actuation of the withdrawal of the tines 41 and 46 from the muffins M, as before described in connection with FIGS. 4 and 5. Again the control and actuating air lines which are pressurized for the withdrawal mode are shown in heavy line in FIG. 5. The corresponding lines exhausting to atmosphere are shown in light line. A second pilot valve 77, which is operationally engaged by the control cam 65 in the described rotational phase relative to its engagement with the pilot valve 66, as shown in FIG. 5, actuates the tine withdrawal mode. The shuttle valve 73 operatively fluid-connects with and is controlled by the second pilot valve 77. The directional control valve 73', which is in fluid communication with and operationally controlled by the shuttle valve 73, diverts the control air to actuating the withdrawal of the tines 41 and 46 from muffins M.

In the withdrawal mode, the head ends of the cylinders 44 and 52 exhaust to the atmosphere. The first pilots 74 and 74', which are in fluid communication with and operationally controlled by the directional control valve 73', command the exhaustion of air from the head ends of the cylinders 44 and 52 during this mode of operation. The pilot-operated flow control valves 75 and 75', which are under the command of the first pilots 74–74', now open the head ends of the cylinders 44 and 52 to exhaust to atmosphere.

Simultaneously with the exhaust of the head ends of cylinders 44 and 52, the second pilots 78 and 78', which are in fluid communication with and operationally controlled by the directional control valve 73', command the delivery of actuating air to the rod ends of the cylinders 44 and 52 through the second pilot-operated flow control valves 79 and 79' to deliver air from the main source 70 to the rod ends of cylinders 44 and 52.

Thus the pilot operated flow control valves 75 and 75' and 79 and 79', which are in fluid communication with the head ends and the rod ends of the cylinders 52 and 44, respectively, when operating under the command of the pilots 74 and 74' and 78 and 78', exhaust the head ends and supply the rod ends of the cylinders 52 and 44 with pressurized air; so that, upon the control cam 65 engaging the second pilot valve 77, the tines 41 and 46 are withdrawn from muffins M in simultaneous reciprocal cooperation of the tines.

Although several specific embodiments of this invention have been herein shown and described, it will be understood that the details and construction shown may be altered or omitted without departing from the spirit of the invention as defined by the appended claims.

I claim:

1. An automatic muffin tining and splitting machine comprising:
    a. a frame having a first and a second side, a first and a second end panel, a horizontal top and a bottom;
    b. a belt horizontally traveling on said top from said first to said second end panels between said sides;
    c. a drive train engaging the belt for said travel;
    d. a first tine section having a plurality of tines mounted on said top adjacent to and movable horizontally in traverse over said belt for the tining of muffins thereon from said first side of the frame;
    e. a second tine section having a plurality of tines mounted on said top adjacent to and movable horizontally in traverse over said belt in the plane of and interdigitatingly with respect to the tines of the first tine section for the tining of the muffins from the second side of the frame;
    f. a first tining double-acting air cylinder mounted on the first side of the frame and having a rod end horizontally engaging said first tine section;
    g. a second tining double-acting air cylinder mounted on the second side of the frame and having a rod end horizontally engaging said second tine section;
    h. a pneumatic lifting means for one of said tine sections for splitting of the muffins at the plane of tining;
    i. a first cam-actuated valve means operable for delivering air to said first and second double-acting air cylinders for simultaneous reciprocal cooperation of first and second tining sets and a second cylinder-actuated valve means for delivering air to said pneumatic lifting means for coordinated lift of said one tine section out of the plane of interdigitation with the other tine section at the time of the completion of the muffin penetration;
    j. cam and cylinder means actuated in timed relation with said drive means for operating said first and second valve means, respectively; and
    k. pressurized air supply means connected with said valve means.

2. An automatic muffin tining and splitting machine as set forth in claim 1 wherein said one tine section pneumatic lifting means comprises:
    a. spaced forebars and backbars vertically mounted to each of the end panels of said frame adjacent the said one tine section;
    b. first and second slide plates mounted to said one tine section adjacent to the first and second end panels, respectively, for vertical slidable movement guided between said forebars and backbars;
    c. bracket means mounted on said slide plates; and
    d. first and second lift air cylinders mounted to the first and second end plates, respectively, and having rod ends vertically engaging the respective bracket means for lifting the said one tine section and splitting the muffin.

3. An automatic muffin tining and splitting machine as set forth in claim 2 wherein said bracket means comprises
    a. a bracket having a threaded hole;
    b. a bolt threaded into said threaded hole and positioned for endwise engagement by said rod ends for adjusting the lift of the said one tine section and the extent of splitting of the muffin; and
    c. a jambnut engaging said bolt and said bracket for fixing the adjusted position of the bolt.

4. An automatic muffin tining and splitting machine as set forth in claim 1 wherein said drive train comprises:
    a. a prime mover mounted on the frame and having a shaft;
    b. a sprocket drive mounted on said frame and operationally connected to said prime mover shaft and including an output shaft rotatably mounted to said frame; and
    c. a drive pulley mounted to the output shaft of said sprocket drive for driving the said belt.

5. An automatic muffin tining and splitting machine as set forth in claim 1 wherein said cam-actuated first valve means comprises:
    a. a main air supply line 70;
    b. a first pilot valve 66 in fluid communication with the air supply line 70 and operationally engaged by a control cam 65;
    c. a shuttle valve 73 in fluid communication with the first pilot valve 66;
    d. a directional control valve 73' in fluid communication with and operationally controlled by the shuttle valve 73;
    e. a pair of first pilots 74–74' each in fluid communication with and operationally controlled by the first directional control valve 73';
    f. a pair of first pilot-operated flow control valves 75–75' each in fluid communication with and operationally controlled by a respective one of first pilots 74–74', the head of each of the tining air cylinders being in fluid communication with a respective one of the first pilot-operated flow control valves 75–75' for the penetration of the tines into the muffins;
    g. a second pilot valve 77 in fluid communication with the air supply line 70 and operationally engaged by the control cam 65 sequentially with respect to the first pilot valve 66, said second pilot valve 77 communicating with said shuttle valve 73;
    h. a pair of second pilots 78–78' each in fluid communication with and operationally controlled by said directional control valve 73';
    i. a pair of second pilot-operated flow control valves 79–79' in fluid communication with and operationally controlled by the second pilots 78–78', the rod ends of tining air cylinders 52–44 being in fluid communication with second pilot-operated flow control valves 79–79', respectively, for the withdrawal of the tines from the muffins; and wherein said cylinder-actuated second valve means comprises:

a third pilot valve 76' having communication with the supply line 70 and operationally engaged by the said other tine section at the time of the completion of the muffin penetration.

6. An automatic muffin tining and splitting machine as set forth in claim 1 wherein said pneumatic lifting means comprises a pair of single-acting lift air cylinders 58–58' mounted one at each end of said frame and connected in fluid communication with the third pilot valve 76' for lifting the said one tine section upon completion of the muffin penetration.

* * * * *